United States Patent [19]

Watanabe

[11] Patent Number: 4,805,973
[45] Date of Patent: Feb. 21, 1989

[54] METHOD OF RECORDING CONTINUOUS TONE IMAGE

[75] Inventor: Hideo Watanabe, Kanagawa, Japan

[73] Assignee: Fuji Photo Film Co., Ltd., Kanagawa, Japan

[21] Appl. No.: 847,372

[22] Filed: Apr. 2, 1986

[30] Foreign Application Priority Data

Apr. 3, 1985 [JP] Japan ................................. 60-70500

[51] Int. Cl.⁴ ........................................... G02B 26/10
[52] U.S. Cl. ...................................... 350/66; 350/6.8; 346/107 R; 346/108
[58] Field of Search ..................... 346/1.1, 107 R, 108; 358/296, 298, 302; 350/6.6, 6.8; 219/121 LS; 356/72, 152

[56] References Cited

U.S. PATENT DOCUMENTS

| | | | |
|---|---|---|---|
| 4,002,829 | 1/1977 | Hutchison | 358/302 X |
| 4,535,342 | 8/1985 | Ohara et al. | 346/108 |
| 4,631,551 | 12/1986 | Vergona | 346/108 |
| 4,655,590 | 4/1987 | Aagano et al. | 219/121 LS X |
| 4,681,394 | 7/1987 | Noguchi | 350/6.6 |

Primary Examiner—A. C. Prescott
Assistant Examiner—Jane Lau
Attorney, Agent, or Firm—Sughrue, Mion, Zinn, Macpeak & Seas

[57] ABSTRACT

In a method of recording a continuous tone image by controlling a drive current for a semiconductor laser in accordance with image density signal and modulating the intensity of a laser beam emitted by the semiconductor laser, laser beams emitted by a plurality of semiconductor lasers which respectively emit laser beams of wavelength ranges with regard to the spectral sensitivity of the photosensitive material. The photosensitive material is scanned by a coalesced laser beam, and the drive current of the respective semiconductor lasers is controlled.

4 Claims, 1 Drawing Sheet

METHOD OF RECORDING CONTINUOUS TONE IMAGE

BACKGROUND OF THE INVENTION

1. Field of the Invention

This invention relates to an image recording method for recording an image on a photosensitive material by scanning the photosensitive material with a light beam. This invention particularly relates to a continuous tone image recording method for obtaining a continuous tone image by modulating the intensity of a laser beam emitted by a semiconductor laser and scanning a continuous tone-formable photosensitive material with the laser beam.

2. Description of the Prior Art

Light beam scanning recording apparatuses wherein a light beam is deflected by a light deflector to scan a photosensitive material to record an image thereon have heretofore been widely used. As one of the means for generating the light beam of such apparatuses, a semiconductor laser is used. The semiconductor laser has various advantages over a gas laser or the like in that the semiconductor laser is small, cheap and consumes little power, and can be modulated directly by changing the drive current.

FIG. 2 is a graph showing the relationship between the drive current and the light output of a semiconductor laser. Though the semiconductor laser has various advantages as described above, it has the drawback that the light output characteristics with respect to the drive current sharply change at a point "a" as shown in FIG. 2. Therefore, it is not always possible to use the semiconductor laser recording of a continuous tone image. Specifically, it is not always possible to control the light output across the point "a" at which the light output characteristics change sharply. Further, when intensity modulation is conducted utilizing only the linear characteristic range above the change point "a", the dynamic range of the light output is limited to two orders of magnitude at the most. As is known, with a dynamic range of this order, it is impossible to obtain a continuous tone image of high quality.

Accordingly, various attempts have been made to obtain a continuous tone image by fixing the light output of the semiconductor laser, continuously switching the semiconductor laser on and off to generate scanning beam pulses, and controlling the number of pulses for respective picture elements in accordance with an image density signal, or controlling the pulse width to change the scanning light amount.

However, in the case where pulse number modulation is conducted as described above, in order to ensure density resolution within a range of three orders of magnitude, i.e. scanning light quantity resolution, at a picture element frequency of, for example, 100 kHz, the pulse frequency must be adjusted very high, i.e. to 0.1 GHz (a period of 10 nanoseconds). Though the semiconductor laser can be switched on and off at such a frequency, it is generally impossible for a pulse count circuit for pulse number control or the like to operate at the high frequency. Therefore, the picture element frequency must be decreased markedly below the aforesaid value. Accordingly, when a continuous tone image is recorded by pulse number modulation to ensure high density resolution, the recording speed becomes very low. Also, when pulse width modulation is conducted, in order to satisfy the aforesaid requirement, it is necessary to switch the pulses on and off within at least approximately 10 nanoseconds, and the same problem arises.

SUMMARY OF THE INVENTION

The primary object of the present invention is to provide a continuous tone image recording method wherein semiconductor lasers are used as a recording light source and a continuous tone image of high quality is recorded.

Another object of the present invention is to provide a continuous tone image recording method wherein a continuous tone image of high quality is recorded quickly.

The present invention provides a continuous tone image recording method for controlling the drive current a semiconductor laser in accordance with an image density signal, modulating the intensity of a laser beam emitted by the semiconductor laser, scanning a continuous tone-formable photosensitive material with the intensity modulated laser beam, and recording a continuous tone image on the photosensitive material, wherein the improvement comprises the steps of: coalescing laser beams emitted by a plurality of semiconductor lasers respectively emitting laser beams of wavelength ranges which as respects the spectral sensitivity of said photosensitive material, scanning said photosensitive material with the coalesced laser beam, and controlling said drive current for the respective semiconductor lasers.

When the spectral sensitivity of the photosensitive material is different with respect to the wavelength ranges of the plurality of the laser beams and the photosensitive material is exposed to laser beams of the same intensity, the effective light amounts for exposure of the photosensitive material are different. Therefore, by intensity modulating plurality of the laser beams and scanning the photosensitive material with the coalesced laser beam, it is possible to improve the density resolution.

In the continuous tone image recording method of the present invention, since a sufficiently high density resolution is obtained even though semiconductor lasers exhibiting a comparatively small dynamic range of light output are used as the recording light source, it is possible to obtain a continuous tone image of high quality. Further, since high density resolution is obtained only by intensity modulation of the laser beams without conducting pulse number modulation or pulse width modulation, it becomes possible to quickly record a continuous tone image of high quality.

DESCRIPTION OF THE PREFERRED EMBODIMENTS

The present invention will hereinbelow be described in further detail with reference to the accompanying drawings.

Figure 1:
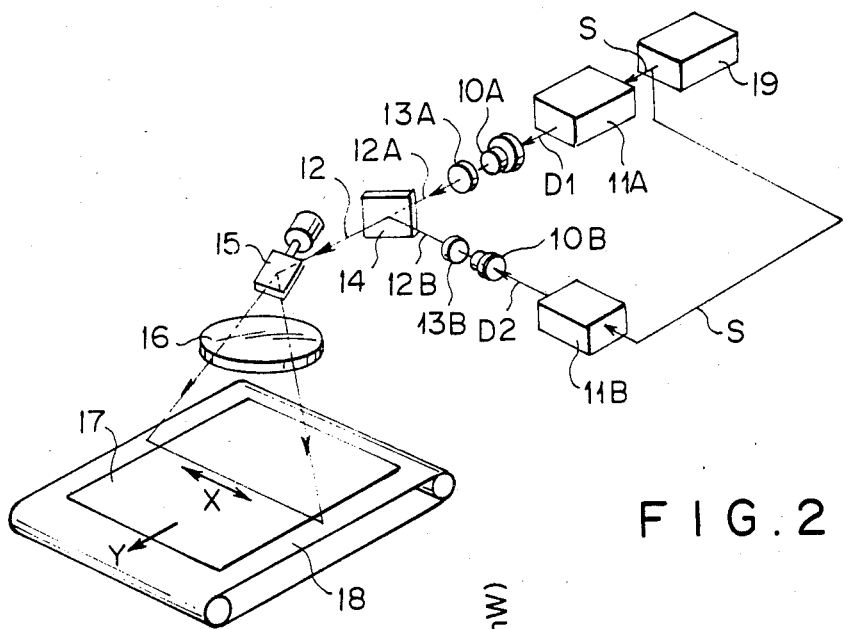
FIG. 1 is a schematic view showing an embodiment of the apparatus for carrying out the continuous tone image recording method in accordance with the present invention.

Referring to FIG. 1, the apparatus is provided with, by way of example, two semiconductor lasers. Semiconductor lasers 10A and 10B respectively receive drive currents D1 and D2 fed by drive circuits 11A and 11B, and emit laser beams 12A and 12B of a light emission intensity corresponding to the drive currents D1 and D2. The laser beams 12A and 12B are converted to parallel rays by collimator lenses 13A and 13B, and then coalesced into a beam 12 by a beam coalescing means 14 constituted by a semitransparent mirror, a polarization beam splitter or the like. The coalesced beam 12 is deflected by a light deflector 15 which may be a galvanometer mirror or the like. Then, the coalesced beam 12 passes through a scanning lens 16 (which is normally an fθ lens), and is converged onto a continuous tone-forming photosensitive material 17 which may be silver halide photographic film or the like. In this manner, the coalesced beam 12 scans the photosensitive material 17 in the main scanning direction as indicated by the arrow X. At the same time, the photosensitive material 17 is moved by a recording material movement means 18 constituted by an endless belt device or the like in the sub-scanning direction, as indicated by the arrow Y, approximately normal to the main scanning direction indicated by the arrow X. As a result, the whole surface of the photosensitive material 17 is scanned by the coalesced beam 12, and a two-dimensional image is formed thereon.

Figure 2:
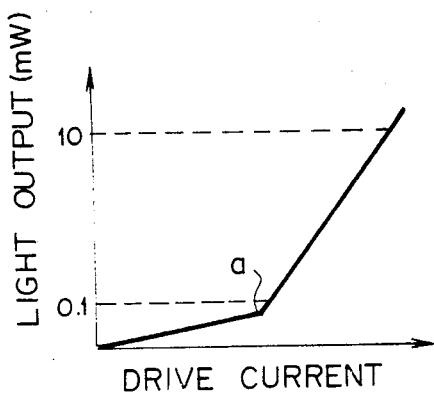
FIG. 2 is a graph showing the relationship between the drive current and the light output of the laser beam.

The image recorded on the photosensitive material 17 is of continuous tone since the coalesced beam 12 is modulated as described below. Semiconductor lasers 10A and 10B exhibit the current-light output characteristics as shown in FIG. 2. The drive currents D1 and D2 are changed to operate the semiconductor lasers 10A and 10B within the light output range of, for example, 0.1 mW to 10 mW. Thus given the variable light output of the laser beams 12A and 12B, resolution over a two order of magnitude range is ensured. As shown in FIG. 2, the light output range of 0.1 mW to 10 mW is above the light output characteristic change point "a". Therefore, the light output quantity of the laser beams 12A and 12B changes linearly with respect to the drive currents D1 and D2, and the light output quantity control is conducted easily. Since the drive circuits 11A and 11B operate to change the drive currents D1 and D2 in accordance with an image density signal S fed by an image signal feeder 19, the light quantity of the coalesced beam 12 is changed in accordance with the image density signal S, and the continuous tone image which the image density signal S represents is recorded on the photosensitive material 17.

Figure 3:
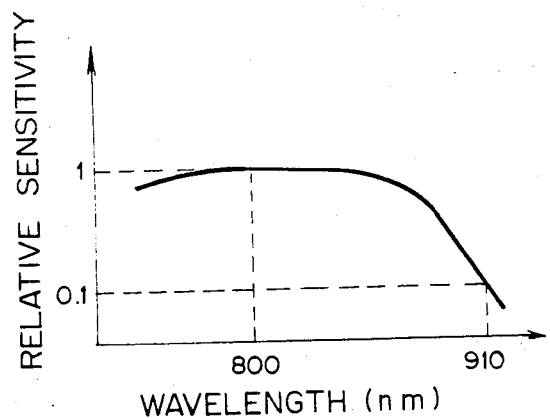
FIG. 3 is a graph showing the spectral sensitivity characteristics of the photosensitive material.

In order to obtain a continuous tone image of high quality, density resolution over three orders of magnitude is required. In this embodiment, high density resolution is ensured as described below. As is known, the relative sensitivity of the photosensitive material such as silver halide photographic film changes with light wavelength. By way of example, the photosensitive material 17 used in this embodiment exhibits the spectral sensitivity characteristics shown in FIG. 3. Also, the semiconductor lasers 10A and 10B emit the laser beams 12A and 12B respectively having wavelengths of 910 nm and 800 nm. As shown in FIG. 3, the relative sensitivity of the photosensitive material 17 with respect to light having a wavelength of 910 nm is 1/10 the relative sensitivity with respect to light having a wavelength of 800 nm. That is, even though the photosensitive material 17 is exposed to the laser beams 12A and 12B so as to receive the same quantity of light from each, the effective light amounts for exposure of the photosensitive material 17 are different, and the effective light amount of the laser beam 12A is 1/10 of that of the laser beam 12B. For example, in the case where the effective light output quantity of the laser beam 12A with respect to the photosensitive material 17 when the light output of the semiconductor laser 10A is 0.1 mW is designated by L, the effective light amount of the laser beam 12B when the light output of the semiconductor laser 10B is 0.1 mW is 10L. Thus the laser beam 12A is intensity modulated within the effective light quantity range of L to 100L. On the other hand, the laser beam 12B is intensity modulated within the effective light quantity range of 10L to 1,000L. Accordingly, by combinations of the light output of the laser beam 12A with the laser beam 12B, the effective light quantity of the coalesced beam 12 with respect to the photosensitive material 17 is controlled within the range of L to 1,100L in intervals of L, and density resolution over three orders of magnitude is ensured.

In the aforesaid embodiment, it is assumed that the laser beams 12A and 12B are coalesced at the same efficiency by the beam coalescing means 14. However, where a semitransparent mirror and a polarization beam splitter are used, the light transmittance may differ from the light reflectivity with wavelength. In such a case, the light output ratio of the semiconductor laser 10A to the semiconductor laser 10B does not become equal to the light quantity ratio of the laser beam 12A to the laser beam 12B in the coalesced beam 12. The effective light amount for exposure of the photosensitive material 17 is fixed by the light outputs of the semiconductor lasers 10A and 10B, the spectral sensitivity characteristics, the light transmittance, and the light reflectivity.

The continuous tone-forming photosensitive material used in the method of the present invention is not limited to that exhibiting the spectral sensitivity characteristics as shown in FIG. 3; a photosensitive material exhibiting other spectral sensitivity characteristics may be used. As understood from the specification, in order to improve the density resolution, it is advantageous to use a photosensitive material whose relative sensitivity changes greatly with light wavelength. Further, the semiconductor lasers 10A and 10B are not limited to those emitting the laser beams 12A and 12B having the aforesaid wavelengths; it is possible to select semiconductor lasers emitting laser beams of different wavelength ranges suitable for the spectral sensitivity of the photosensitive material.

In the aforesaid embodiment, two laser beams are coalesced into the beam 12. However, it is also possible to scan the photosensitive material by a laser beam obtained by coalescing three or more laser beams. Further, as the light deflector 15 for deflecting the laser beam, instead of the galvanometer mirror, it is also possible to use a multi-face rotating mirror (polygon mirror), a hologram scanner, an AOD (acousto-optic deflector), or the like.

I claim:

1. In a continuous tone image recording method for controlling a drive circuit of a semiconductor laser to modulate the intensity of a laser beam emitted therefrom in accordance with an image density signal, and scanning a continuous tone-forming photosensitive material with the intensity modulated laser beam to record a continuous tone image on the photosensitive material, the improvement comprising the steps of:

providing a plurality of semiconductor lasers, controlling drive currents of the respective semiconductor lasers to thereby produce plural intensity modulated laser beams, coalescing the laser beams emitted by said plurality of semiconductor lasers, said lasers respectively emitting laser beams of different wavelengths, the spectral sensitivity of said photosensitive material being different for said different wavelengths, and scanning said photosensitive material with the coalesced laser beam.

2. A method as defined in claim 1 wherein said semiconductor lasers emit laser beams having wavelengths of 910 nm and 800 nm.

3. A method as defined in claim 1 wherein said photosensitive material exhibits spectral sensitivity characteristics such that the relative sensitivity with respect to one of said laser beams at a first wavelength is approximately 1/10 the relative sensitivity with respect to one of said laser beams at a second wavelength.

4. A method as defined in claim 1 wherein said photosensitive material is scanned by said coalesced laser beam in two directions.

* * * * *